T. J. CARRICK.
Clamp.
No. 229,670.
Patented July 6, 1880.
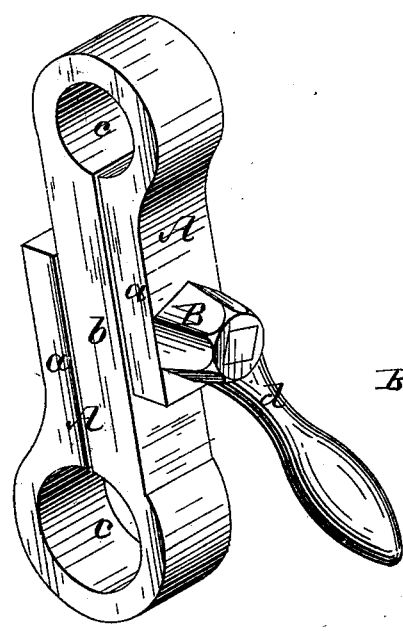
Fig. 1,
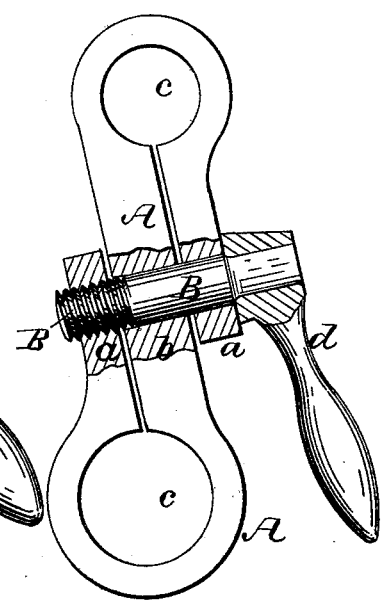
Fig. 2,
WITNESSES
INVENTOR
Thos. J Carrick,
by
his ATTORNEY.

UNITED STATES PATENT OFFICE.

THOMAS J. CARRICK, OF BALTIMORE, MARYLAND, ASSIGNOR TO JOHN W. SELBY, OF NEW YORK, N. Y.

CLAMP.

SPECIFICATION forming part of Letters Patent No. 229,670, dated July 6, 1880.

Application filed June 9, 1880. (No model.)

*To all whom it may concern:*

Be it known that I, THOMAS J. CARRICK, of Baltimore, in the county of Baltimore and State of Maryland, have invented certain new and useful Improvements in Clamps, of which the following is a specification.

The clamp in which my invention is comprised consists of an S-shaped link having a bearing at each bend or loop, in combination with a clamping device acting on the free ends of the loop and the intermediate link-body under such an arrangement that by means of said clamping device the two bearings may be simultaneously tightened upon or loosened from the journals which they are adapted to receive.

The nature of my invention and the manner in which the same is or may be carried into effect will be understood by reference to the accompanying drawings, in which—

Figure 1 is a perspective view, and Fig. 2 a side elevation, of a clamp embodying said invention in its preferred form.

A is the link, which has approximately an S shape. It is preferably made of one piece or strip of spring metal, as indicated in the drawings, the ends of the strip being bent back upon the body of the link and on opposite sides thereof to such an extent that a clamping-screw, B, may pass through the free ends $a$ of the loop and the intermediate link-body, $b$.

At each bend or loop is formed a tubular bearing, $c$, which, in cross-section, may be either cylindrical or square or polygonal, or of any other suitable shape, this depending upon the form of the journal, pin, or rod which it is intended to receive and hold.

The link, instead of being made of one continuous piece of metal, may be otherwise constructed—as, for instance, the ends of the link may be jointed or hinged to the body at the bends.

Any suitable clamping device may be made use of. That which is shown in the drawings is simple and well adapted for the purpose. It consists of a screw, B, which passes loosely through one of the ends $a$ and the intermediate body, $b$, and screws into the other end $a$. A suitable handle is attached to the head of the clamping-screw, as shown at $d$. When the screw is tightened the two ends $a$ will be drawn against the body $b$, thus contracting the tubular bearings $c$ and causing them to bind upon the rods, pins, or journals which may have been placed in them. On the other hand, when the screw is loosened the ends $a$ can spring apart and the bearings can consequently expand.

The device above described is useful in any connection where it is desirable to tighten or loosen two bearings simultaneously.

What I claim as my invention, and desire to secure by Letters Patent, is—

1. A link the body of which is provided with end bearings formed, in part, of two arms whose free ends are bound to the body of the link by a clamping device, substantially as hereinbefore set forth.

2. The S-link with end bearings, in combination with the clamping device, substantially as hereinbefore set forth.

In testimony whereof I have hereunto set my hand this 22d day of April, 1880.

THOMAS J. CARRICK.

Attest:
   GEO. MCCAFFRAY,
   STEPTOE THOMPSON.